United States Patent
Huff

(10) Patent No.: US 7,959,433 B2
(45) Date of Patent: Jun. 14, 2011

(54) HIGHLY CONTROLLABLE GAS GRILL BURNER SYSTEM

(75) Inventor: G.L. Huff, Afton, TN (US)

(73) Assignee: Meco Corporation, Greenville, TN (US)

(*) Notice: Subject to any disclaimer, the term of this patent is extended or adjusted under 35 U.S.C. 154(b) by 0 days.

(21) Appl. No.: 11/416,191

(22) Filed: May 3, 2006

(65) Prior Publication Data

US 2007/0048683 A1    Mar. 1, 2007

Related U.S. Application Data

(60) Provisional application No. 60/711,674, filed on Aug. 29, 2005.

(51) Int. Cl.
*F23N 1/02* (2006.01)
(52) U.S. Cl. ............ 431/278; 431/8; 431/12; 431/281
(58) Field of Classification Search .......... 431/278, 431/285; 126/41 R; 219/413, 441, 446.1, 219/476, 464.1, 480, 483–493, 538, 539
See application file for complete search history.

(56) References Cited

U.S. PATENT DOCUMENTS

| | | | |
|---|---|---|---|
| 822,932 A | 6/1906 | Ennis | |
| 955,308 A | 4/1910 | Bean | |
| 1,791,565 A | 2/1931 | Killam | |
| 3,023,298 A * | 2/1962 | Wells | 219/450.1 |
| 3,638,635 A | 2/1972 | Drennan | |
| 3,693,536 A | 9/1972 | Carville et al. | |
| 5,127,824 A | 7/1992 | Barker | |
| 5,906,485 A * | 5/1999 | Groff et al. | 432/121 |
| 5,935,531 A * | 8/1999 | Giacobbe | 422/197 |
| 6,488,022 B2 | 12/2002 | Shingler | |
| 6,881,055 B2 | 4/2005 | Bird | |

* cited by examiner

*Primary Examiner* — Alfred Basichas
(74) *Attorney, Agent, or Firm* — McGuireWoods LLP

(57) ABSTRACT

A grill for cooking includes a first set of burners and a second set of burners wherein at least one burner of the first set of burners is interdigitally arranged with burners of the second set of burners. The grill further includes a first valve that controls a flow of fuel to the first set of burners and a second valve that controls a flow of fuel to the second set of burners.

19 Claims, 4 Drawing Sheets

| Cooking Temperature Possibilities | | |
|---|---|---|
| Cooking Temperature | Valve For Burner Set One | Valve for Burner Set Two |
| Highest | High | High |
| Medium High | Medium | Medium |
| Medium 2 | Off | Medium |
| Medium 1 | Low | Low |
| Medium Low | Off | Low |
| Lowest | Low | Off |

FIGURE 2

HIGHLY CONTROLLABLE GAS GRILL BURNER SYSTEM

CROSS-REFERENCE TO RELATED APPLICATIONS

This application claims priority under 35 U.S.C. §119(e) to provisional U.S. Patent Application No. 60/711,674, filed on Aug. 29, 2005, the disclosure of which is expressly incorporated by reference herein in its entirety.

BACKGROUND OF THE INVENTION

1. Field of the Invention

The invention is directed generally to a method and apparatus for controlling a grill cooking temperature with higher accuracy and over a greater grill area.

2. Related Art

The majority of gas grills typically have two to six main burners. Each of these burners is controlled by a single valve, which controls the gas flow to a particular burner in a particular grill area. The remaining burners are also each controlled by a valve. If a user of the grill wants high heat over the entire grill area, this system is sufficient to provide high heat when the valves are all turned completely on and all the main burners are operated at the same time. Similarly, when the user of the grill wants a medium heat setting over the entire grill area, with the existing system all the valves are turned to their lowest setting, thus providing medium heat.

However, if the user wants to more reliably control the heat, control the heat to a greater degree, and/or have a more even or uniform heat, then the typical grill is not able to provide such burner control over an entire grill area. In this regard, the relationship between the gas flow input of the burners, the burner ports, and/or the amount of primary air intake, limit the range of control to the point that the user cannot have very high heat for searing and very low heat for slow cooking, such as smoking, over the entire grill area.

For example, if the user wants lower heat for very slow cooking in a conventional grill, then the user may turn on one or two burners at one end of the grill area, and place the meat or other food to be cooked at the other end of the grill area. This very low heat cooking process forms a very limited capacity in that the cooking area is greatly reduced (by half) because the heated end of the cooking area cannot be utilized for cooking because it is too hot. Moreover, the heat will also not be uniform in that food will be spaced at a varying distance from the heated grill area.

Accordingly, there is a need for a grill that can cook both at low temperature and high temperature with greater accuracy over the entire grill area.

SUMMARY OF THE INVENTION

The invention meets the foregoing need and provides a method and apparatus for controlling cooking temperatures over a greater range with greater accuracy over a larger grill area and that furthermore includes other advantages apparent from the discussion herein.

The invention may be implemented in a number of ways. According to one aspect of the invention a grill for cooking includes a first set of burners, a second set of burners wherein at least one burner of the first set of burners is interdigitally arranged with burners of the second set of burners, a first valve that controls a flow of fuel to the first set of burners, and a second valve that controls a flow of fuel to the second set of burners.

The grill may include a first manifold configured to deliver the fuel from the first valve to the first set of burners, and a second manifold configured to deliver the fuel from the second valve to the second set of burners. The grill may include a primary intake integrated in each of the burners. The first set of burners may include first burner ports and the second set of burners may include second burner ports and the first and second burner ports may be sized one of the same or differently. The grill may include a third set of burners. At least one burner of the third set of burners may be interdigitally arranged with burners of at least the first or second set of burners. The grill may include a third valve that controls the flow of fuel to the third set of burners, a third manifold that delivers the fuel from the third valve to the third set of burners, and a primary air intake integrated in each of the burners. The grill may include a temperature sensor to sense at least one of the cooking temperature or the food temperature, and a controller to obtain a sensor output from the sensor. The grill may include an output device connected to the controller configured to output one of an audio or visual sensor signal. The controller may be configured to output a signal when the cooking temperature or the temperature of the food has one of reached or exceeded a particular temperature threshold. The controller may be configured to drive at least one of the first or second valves to modulate the gas flow to maintain a preset cooking temperature.

Another aspect of the invention includes a method of operating a gas grill includes the steps of arranging a first set of burners in the grill, arranging a second set of burners in the grill, wherein at least one burner of the first set of burners is interdigitally arranged with burners of the second set of burners, connecting the first set of burners to a first valve to control a flow of fuel, and connecting a second valve to control a flow of fuel to the second set of burners.

The method may include the steps of arranging a first manifold to deliver the fuel from the first valve to the first set of burners, and arranging a second manifold to deliver the fuel from the second valve to the second set of burners. The method may include arranging a third set of burners in the gas grill. At least one of the third set of burners may be interdigitally arranged with at least some of the first or second set of burners. The method may include arranging a third valve that controls the flow of fuel to the third set of burners. The method may include arranging a temperature sensor in the gas grill to sense one of the cooking temperature or food temperature. The method may include outputting a signal based on the temperature sensed by the temperature sensor. The method may include driving at least one of the first or second valves to modulate the gas flow to maintain a preset cooking temperature.

Yet another aspect a device for heating includes a first set of burners, a second set of burners, a third set of burners wherein at least one burner of one of the sets of burners is interdigitally arranged with burners of another one of the sets of burners, a first valve that controls a flow of fuel to the first set of burners, a second valve that controls a flow of fuel to the second set of burners, and a third valve that controls the flow of fuel to the third set of burners.

The device for heating may include a first manifold configured to deliver the fuel from the first valve to the first set of burners, a second manifold configured to deliver the fuel from the second valve to the second set of burners, a third manifold that delivers the fuel from the third valve to the third set of burners, at least one primary air intake integrated in each of the burners, and the first set of burners may include first burner ports, the second set of burners may include second burner ports, and the third set of burners may include third burner ports and the burner ports may be sized one of the same or differently.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings:

FIG. 2 shows a table illustrating the combination of cooking temperatures that are possible with the FIG. 1 burner arrangement;

DETAILED DESCRIPTION OF THE INVENTION

Figure 1:
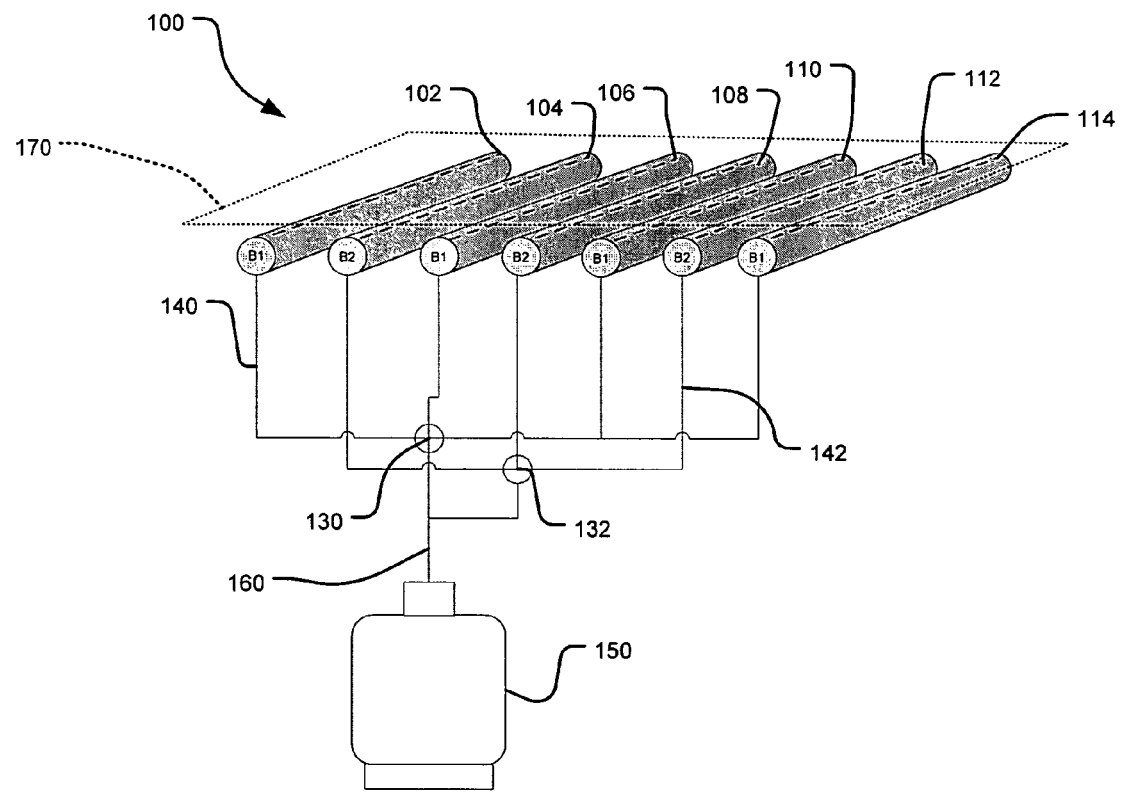
FIG. 1 schematically illustrates an arrangement of two sets of burners constructed according to the principles of the invention.

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

FIG. 1 illustrates an arrangement of two sets of burners constructed according to the principles of the invention. More specifically, FIG. 1 shows an embodiment of the invention having a greater operational cooking temperature range including very slow cooking at low temperatures over an entire grill area. For example, the arrangement of a grill 100 in FIG. 1 allows a cooking temperature of about 200° F., for example only, over the entire grill area 170. The slow cooking temperature is accomplished through the interdigital (alternate) arrangement of sets of burners such as for example two or more sets of burners. The two sets of burners B1 and B2 are shown in FIG. 1. The burner set B1 includes burners 102, 106, 110, and 114. The burner set B1 may be spaced uniformly over the grill area 170. Moreover, burner set B1 may be controlled by a single valve 130 that supplies fuel to a manifold 140 that feeds fuel to each of the burners in set B1. However, even though it is contemplated that the low temperature burner set B1 may be uniformly arranged over the grill area 170, it may also alternatively be arranged in a non-uniform manner.

A second set of burners B2, may also be spaced uniformly underneath the grill area 170 and includes burners 104, 108, and 112, arranged in an interdigital (alternating) fashion with the burners in set B1 (102, 106, and 114). The burner set B2 may be controlled by a second valve 132 that supplies fuel to the burner set B2 via a manifold 142.

The burners of the second burner set B2 may be sized the same as the burners of the burner set B1 and hence output the same heat. Alternatively, the burners of the burner set B2 may be sized differently such that different gas flow amounts may flow through the ports of the burners of the burner set B2 than the burners of the burner set B1 to generate different amounts of heat.

In this arrangement of the burner set B1 and the burner set B2, there may be a single manifold 160 feeding gas to both the valves 130, 132 from a source, such as tank 150. From each of the two valves 130, 132, the second set of manifolds 140, 142 feed from each respective valve 130, 132 to one of the burner set B1 and the burner set B2 respectively.

Accordingly, the combination of the burner set B1 and the burner set B2 distributed uniformly underneath the grill area 170 allows various combinations of cooking temperatures. In particular, when high heat is desired, then both burner set B2 and burner set B1 may be used. If a low temperature is desired, then only one burner set, such as the burner set B1, may be operated.

Although FIG. 1 is shown with seven burners, it is contemplated that any number of burners may be used in the invention. Moreover, although the B1 set of burners are shown with four burners, and the B2 set of burners are shown with three burners, any number of each of the types of burners is contemplated by the invention.

FIG. 2 shows an exemplary tabular depiction of the combination of cooking temperatures that are possible with the FIG. 1 burner arrangement of the invention. As shown in FIG. 2, the combination of the burner set B1 and the burner set B2 may provide various cooking temperatures from the lowest to the highest temperatures. Moreover, these temperatures are generated across the entire cooking surface 170. In particular, FIG. 2 shows the valve settings that allow for multiple temperature possibilities. The cooking temperature possibilities in this regard may be listed on the actual grill to provide an easy-to-understand control panel graphic. This may allow the user to control the settings, and accordingly operate the grill.

Figure 3:
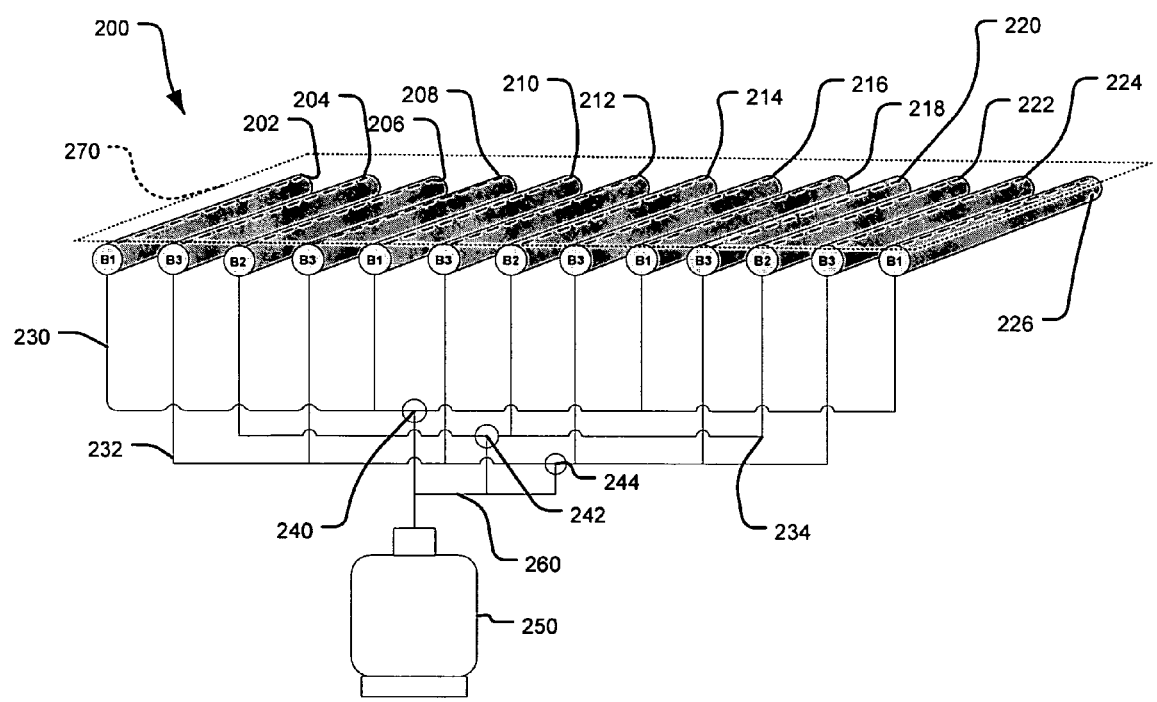
FIG. 3 shows a second embodiment with three different sets of burners with three different valves constructed according to the principles of the invention.

FIG. 3 shows a second embodiment of the invention employing three different sets of burners with three different valves constructed according to the principles of the invention. In this regard, FIG. 3 shows three different interdigitally arranged burner sets B1, B2, and B3. A valve 240 provides cooking fuel to burner set B1 including burners 202, 210, 218 and 226. The burners 202, 210, 218, and 226, together, in conjunction with the valve 240, provide a medium temperature cooking. Another valve 242 provides a low temperature source of cooking fuel to the burner set B2 including burners 206, 214, and 222. Finally, a valve 244 provides the highest flow of fuel to the burner set B3 including burners 204, 208, 212, 216, 220, and 224. As shown in the FIG. 3 embodiment, the burner arrangements across the entire grill area 270 are somewhat uniform. However, it is contemplated that a more or less uniform arrangement of burners may also be employed. Additionally, the above-noted use of temperature can mean the number of burners and/or the amount of heat output from each burner.

As further shown in FIG. 3, the three different burner sets B1, B2, and B3 are connected to the valves 240, 242, 244, with respective manifolds 230, 232, and 234. Moreover, the valves 240, 242, 244 may be connected to one or more fuel sources 250, such as a tank, by a common manifold 260, that holds, for example, liquid petroleum (LP), natural gas, butane, or the like.

Although the invention in FIG. 3 is shown with four of the medium temperature burners, three of the low temperature burners, and five of the high temperature burners, any combination of the low, medium and high temperature burners may be employed in the invention. Further, it is contemplated that any number of valves can operate any number of different sets of burners.

The interdigital relationship of the burners allows for uniform low temperature heat across the entire cooking surface 170. The embodiment of FIGS. 1 and 3 show similar features for each of the sets B1, B2, and/or B3. However it is within the spirit and scope of the invention to have both different size burner sets and different numbers of burners for use with each set. Accordingly, any number of different burners, burners sizes, burner arrangements, and burner configurations is contemplated for use with the invention.

Moreover, the highly controllable gas grill burner system of the invention is contemplated for use in any type of cooking arrangement. In particular, the gas grill arrangement may be used in a typical outdoor type of gas grill for use for outdoor cooking. However, the same arrangement may be used in a typical wall or stand-alone ovens for use inside the home. Additionally, an indoor type of grill may also use the arrangement described herein. Finally, commercial cooking ovens and devices may use the features of the invention.

Although the arrangement described herein has been contemplated for use in cooking, it is equally useful in heating other types of items also. For example it is contemplated that the low or high heat could be used in a manufacturing setting to heat manufactured items to an appropriate temperature as needed. Finally, other arrangements and configurations of the invention are further contemplated.

FIGS. 1 and 3 do not show any additional structure that may be included in a gas grill type of system. In particular the air intake, various connectors, connections, such as for the manifolds, regulators for the regulation of gas flow and the like. Moreover, FIGS. 1 and 3 do not show the additional grill structure which may be associated with any known type of grill. In particular, the grill surface, such as a grid or rack, is arranged typically above the cooking surface to hold food is not shown. Moreover, additional structure such as drip shields or heat shields may also be arranged below such a cooking grid/rack and above the set of burners. Accordingly, any arrangement or configuration of grill structure, or other types of protective shields, lava type rocks and the like may be arranged above the burners and below the grill. Finally, the grill that may be used in conjunction with the FIGS. 1 and 3 arrangement of burners may also include a fire box type of structural arrangement in which the majority of the burners may be arranged. This may include, for example only, a parabolic type reflective surface that may have a tendency to reflect the heat up towards the cooking surface 170, 270. Any ancillary structure not shown, such as the above, is not germane to the invention. One of ordinary skill in the art would be familiar with such structure and its implementation.

Figure 4:
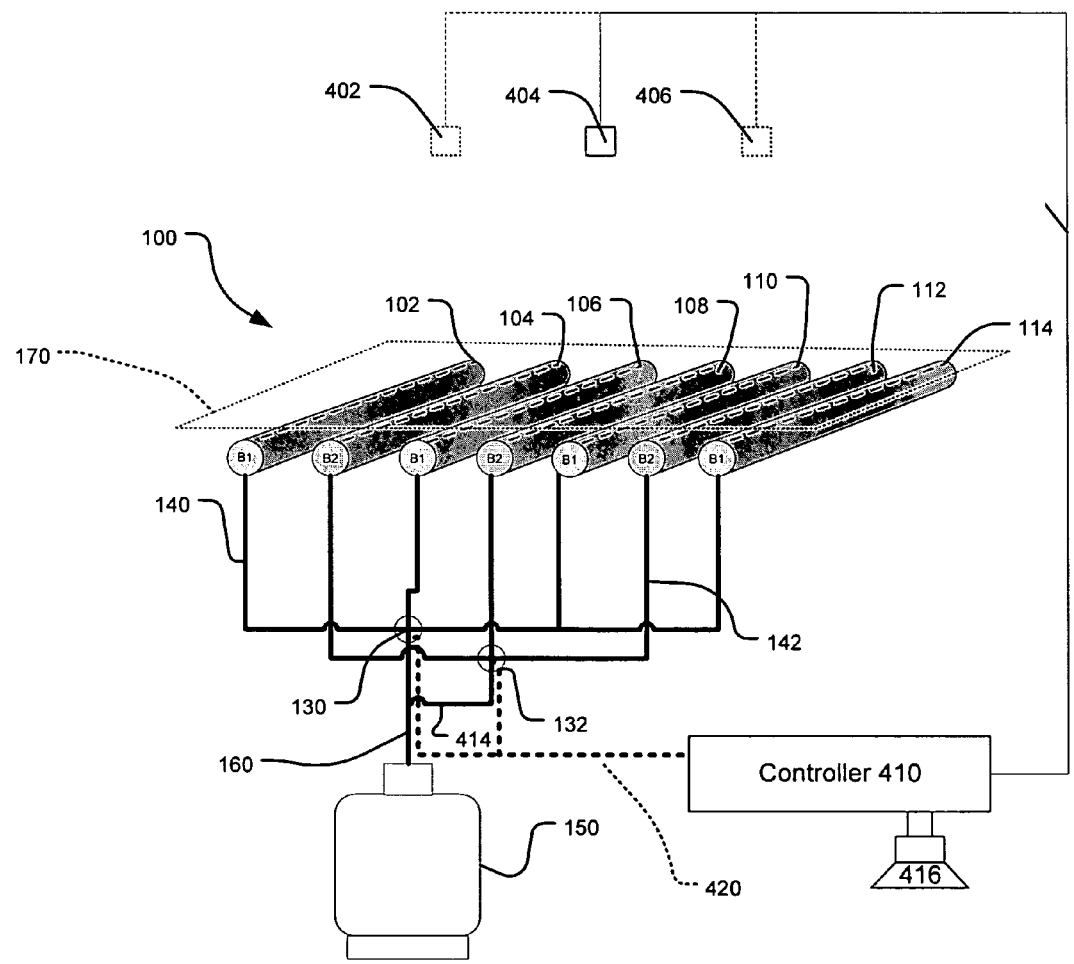
FIG. 4 illustrates an arrangement of two sets of burners constructed according to the principles of the invention having a temperature sensor with a control system.

FIG. 4 schematically illustrates an arrangement of two sets of burners constructed according to the principles of invention with a temperature sensor and a controller. As shown in FIG. 4, a series of temperature sensors of 402, 404, 406 may be arranged above a cooking surface 170 and burner set B1 and B2. In particular, the temperature sensors 402, 404, 406 may be arranged to sense either the cooking surface temperature, the cooking temperature, and/or the temperature of the food that may be cooking on the cooking surface.

Although three sensors are shown as temperature sensors 402, 404, 406 any number of sensors may be arranged anywhere near the cooking surface. In particular, the uniform nature of the cooking surface of the invention may allow a single sensor to determine the temperature of either the cooking surface or the food being cooked. Hence, the other sensors are shown as dashed lines and may not be included.

The temperature sensors 402, 404, 406 may employ any known temperature sensor technology. However, temperature sensors 402, 404, 406 may use thermistor type technology or thermocouple type sensor technology. For example, Negative Temperature Coefficient (NTC) thermistors may be used. These sensors exhibit decreasing electrical resistance with increases in environmental temperature and increasing electrical resistance with decreasing temperature. Positive Temperature Coefficient (PTC) thermistors may also be used and these sensors exhibit increasing electrical resistance with increases in environmental temperature and decreasing electrical resistance with decreasing temperature. Accordingly, a controller may sense the resistance across the temperature sensor 402, 404, 406 implemented as a thermistor to determine a temperature.

Thermocouple-type sensors may also be used. Thermocouples operate based on the Seebeck effect, which occurs in electrical conductors that experience a temperature gradient along their length. It should be apparent that any type of temperature probe including noncontact infrared (IR) thermometers may be used to determine the temperature for the invention.

In case of thermistors the output from such type of sensors will be a change in resistance. The temperature sensors 402, 404, 406 may provide a resistance change measurement to a controller 410. Likewise an infrared type of sensor may have a similar output which may also be determined by controller 410. Controller 410 may use any known processor or controller device including a microprocessor or an application specific integrated circuit (ASIC).

The controller 410 can have several different functions. In particular it is contemplated that the controller 410 may include an output device, such as an audio output device shown by speaker 416 to notify the user when the temperature is no longer within a desirable range. Moreover the controller 410 and output device 416 may also be configured to output when sensing the temperature of the food with a signal indicating that the food is completed cooking or a signal prior to the completion of cooking. Similarly, other types of output devices, such as visual type output devices (LEDs) may be used instead of, or in addition to, the audio output device 416.

Additionally the controller 410 may be configured to drive at least one of the valves 130, 132 to modulate the gas flow to maintain a preset cooking temperature. The cooking temperature being detected as noted-above. In particular, the valves 130, 132 may be configured as solenoid type valves or the like that are operable in response to an electrical signal input to the valves 130, 132. In particular, signal lines 420 may transmit controlling signals from the controller 410 to the valves 130, 132 as shown in FIG. 4. The controller 410 may continuously or discreetly control the gas flow by controlling valves 130, 132 by sensing the temperature with the sensors 402, 404, 406 in a feedback operation.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed:

1. A grill for cooking comprising:
   a first set of burners;
   a second set of burners, wherein burners of said first set of burners are interdigitally and alternatingly arranged with burners of said second set of burners, and wherein said sets of burners are spatially arranged in parallel to produce a substantially uniform cooking temperature across a cooking area of the grill;
   a first valve that controls a flow of fuel to said first set of burners;
   a second valve that controls a flow of fuel to said second set of burners;
   a first manifold configured to deliver the fuel from said first valve to said first set of burners; and
   a second manifold configured to deliver the fuel from said second valve to said second set of burners,
   wherein the first set of burners is configured to operate independently of the second set of burners, and the second set of burners is configured to operate independently of the first set of burners.

2. The grill according to claim 1 further comprising a primary air intake integrated in each of said burners.

3. The grill according to claim 1 wherein said first set of burners further comprises first burner ports and said second set of burners further comprises second burner ports and said first and second burner ports are sized one of the same or differently.

4. The grill according to claim 1 further comprising a third set of burners.

5. The grill according to claim 4 wherein at least one burner of said third set of burners is interdigitally arranged in parallel with burners of at least said first or second set of burners.

6. The grill according to claim 5 further comprising a third valve that controls the flow of fuel to said third set of burners; a third manifold that delivers the fuel from said third valve to said third set of burners; and a primary air intake integrated in each of said burners.

7. The grill according to claim 1 further comprising:
   a temperature sensor to sense at least one of the cooking temperature or the food temperature; and
   a controller to obtain a sensor output from said sensor.

8. The grill according to claim 7 further comprising an output device connected to said controller configured to output one of an audio or visual sensor signal.

9. The grill according to claim 7 wherein said controller is configured to output a signal when the cooking temperature or the temperature of the food has one of reached or exceeded a particular temperature threshold.

10. The grill according to claim 7 wherein said controller is configured to drive at least one of said first or second valves to modulate the gas flow to maintain a preset cooking temperature.

11. The grill according to claim 1 wherein said first set of burners comprises at least a first and second burner and said second set of burners comprises at least a third and fourth burner,
    wherein the second burner is arranged adjacent and between the first and third burner;
    and the third burner is arranged adjacent and between the second and fourth burner.

12. The grill of claim 1, wherein the first set of burners comprises a plurality of straight elongated burners.

13. The grill of claim 12, wherein the straight elongated burners are parallel along their longitudinal axis.

14. The grill of claim 1, wherein the second set of burners comprises a plurality of straight elongated burners.

15. The grill of claim 14, wherein the straight elongated burners are parallel along their longitudinal axis.

16. The grill of claim 1, wherein
    the first set of burners comprises a plurality of straight elongated burners; and
    the second set of burners comprises a plurality of straight elongated burners.

17. The grill of claim 16, wherein the straight elongated burners are parallel along their longitudinal axis.

18. A method of operating a gas grill comprising the steps of:
    arranging a first set of burners in the grill;
    arranging a second set of burners in the grill, wherein burners of the first set of burners are interdigitally and alternatingly arranged with burners of the second set of burners, and wherein said sets of burners are spatially arranged in parallel to produce a substantially uniform cooking temperature across a cooking area of the grill;
    connecting the first set of burners to a first valve to control a flow of fuel;
    connecting a second valve to control a flow of fuel to the second set of burners;
    arranging a first manifold to deliver the fuel from the first valve to the first set of burners;
    arranging a second manifold to deliver the fuel from the second valve to the second set of burners; and
    operating the first set of burners independently of the second set of burners.

19. The method of claim 18, further comprising operating the second set of burners independently of the first set of burners.

* * * * *